Figure 1:
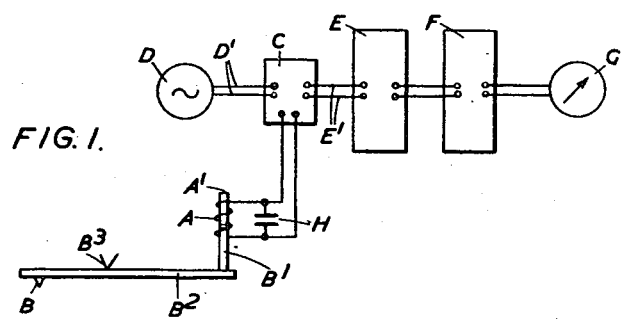

Inventor
Richard E. Reason
By
Emery, Holcomb & Blair
Attorney

Patented July 31, 1951

2,562,640

UNITED STATES PATENT OFFICE 2,562,640

ELECTROMAGNETIC DETECTOR DEVICE FOR USE IN MEASURING APPARATUS

Richard Edmund Reason, Leicester, England, assignor to Taylor, Taylor & Hobson Limited, Leicester, England, a company of Great Britain Application August 5, 1947, Serial No. 766,367
In Great Britain August 12, 1946

10 Claims. (Cl. 332—2)

This invention relates to an electromagnetic detector device for converting small movements into electrical energy for use in apparatus for measuring small quantities. Although not limited thereto, the invention is especially intended for use in apparatus for measuring or indicating the roughnesses or undulations of a surface, of the kind in which a stylus is traversed along the surface and its working movements approximately normal to the surface are converted into electrical energy for operating an indicating or recording device.

In such apparatus the detector device has comprised a variable air-gap inductance-connected in one arm of an A. C. bridge for effecting amplitude modulation of a high frequency carrier current in accordance with the variations of the air-gap of the inductance dependent on the small movements to be measured. It is desirable that there should be an approximately linear relationship between the movement of the pointer or other indicating element and the change in the air-gap of the inductance. When the inductance has an iron core with a small variable gap to give a usefully high sensitivity, however, the desired linearity is lost, because the inductance of the detector device tends to be an inverse function of the gap. This difficulty has been overcome by arranging the small movements to vary differentially the value of a pair of inductances connected in adjacent arms of the bridge, but such an arrangement involves considerable mechanical inconveniences.

The present invention has for its object to provide a simple detector device employing only a single variable inductance but nevertheless capable of giving a satisfactory linear response.

To this end, the electromagnetic detector device according to the invention comprises an inductance consisting of a coil linked with a magnetic circuit, part of which is movable relatively to the coil in accordance with the movement to be measured for varying the value of the inductance, the inductance variations being utilised to modulate the amplitude of a carrier current whose frequency is high compared with those of the variations of the movement to be measured, means being provided for tuning the inductance to resonance with the carrier frequency when the movable part of the inductance is occupying a position lying within or not far outside the range of operative movement thereof. The operative range is considered to be that part of the mechanically possible range of movement of the movable part of the inductance which corresponds to the full-scale movement of the indicating or recording device.

Although the tuning means may consist of a series condenser, it is preferably in the form of a condenser in parallel with the inductance. The modulation of the carrier current is conveniently effected in a bridge circuit, in one arm of which the tuned inductance is connected. The bridge circuit may be arranged in various ways.

In one constructionally simple arrangement the other arms of the bridge are resistive, the bridge being balanced when the movable part of the inductance occupies the resonant tuning position. In this arrangement the output of the bridge will be mainly dependent on the change of phase of the potential developed across the inductance, and will bear a substantially linear relationship to the movement of the movable part of the inductance provided that the "Q" value of the inductance is high enough, for the phase will then change rapidly through the resonant point in a generally linear manner. The "Q" value of the inductance is defined as the ratio of its reactance to its A. C. resistance, both measured at the operating frequency.

In an alternative arrangement the tuned inductance arm of the bridge is balanced against a reactive arm thereof, the resonant tuning position of the movable part of the inductance lying within or outside one end of the operative range, whilst the balance position of such part lies at or near the other end of the operative range. This arrangement is found to give the desired linear relation when the "Q" value of the inductance is low, as for example when non-laminated iron-cored inductances with small air-gaps are used.

In these arrangements, in order to provide a unidirectional relationship between the movement of the movable part of the inductance and the resultant indication, it is desirable to arrange for the operative range of the device to lie wholly on one side of the balance point of the bridge. It is especially convenient to arrange that the bridge is balanced when a gap in the magnetic circuit of the inductance is closed by the movable part thereof, for this not only provides an effective stop for suppressing the unwanted side of the balance point, but also in the second arrangement has the effect of filtering out unwanted harmonics to a marked extent since the detector arm of the bridge is capacitative and not inductive at the balance point, thus giving a much sharper balance than is obtained in the first arrangement.

It is sometimes desirable to obtain a differential output from the detector device in order to operate a balanced indicator circuit. For this purpose modulation may be effected in a double bridge circuit, the tuned inductance being connected in an arm common to the two halves of the bridge. Thus, when the second of the above arrangements is extended in this way, the tuned inductance arm is balanced in each half of the bridge against a reactive arm, one half of the bridge being balanced when the movable part of the inductance lies outside one end of its operative range, whilst the other half is balanced when such part lies outside the other end of its operative range.

In such a balanced circuit a centre-zero indicator will be used, and this will stand at zero when the two halves of the double bridge deliver equal signals to their respective amplifiers. The magnitude of the standing signal will vary with the separation of the balance points of the two halves of the bridge, and the amplifiers must be capable of handling this signal without gross distortion. To minimise the signal, the tuning points will therefore be separated by not much more than the greatest operative range which has to be covered. It is usual, however, to provide a range of magnifications by varying the gain of the amplifiers. The standing signal corresponding to a separation of the balance points necessary to cover the greatest operative range (least magnification) may then grossly overload the output stage of the amplifier when the gain is greatly increased, for example up to a ratio of 100:1.

It may therefore be desirable with this arrangement to provide means for varying the interval between the balance points of the two halves of the bridge, to suit variation in the amplification factor in the measuring circuit to which the modulated carrier current is fed. Such means may conveniently be ganged with the gain control.

The structural arrangement of the inductance may vary, but in one convenient practical construction, the movable part of the magnetic circuit is in the form of a small plunger passing through a hole in the base of a pot of magnetic material towards the end of a finger protruding centrally downwards from the magnetic cover of the pot, the coil of the inductance being wound on a support surrounding such finger within the pot. The magnetic pot may conveniently be housed within a casing of non-magnetic material, the magnetic cover of the pot being spring-pressed into engagement with the main body of the pot within the casing. The small plunger may be carried on one end of a lever, whose other end carries the stylus or other element whose small movement is to be measured.

Figure 4:
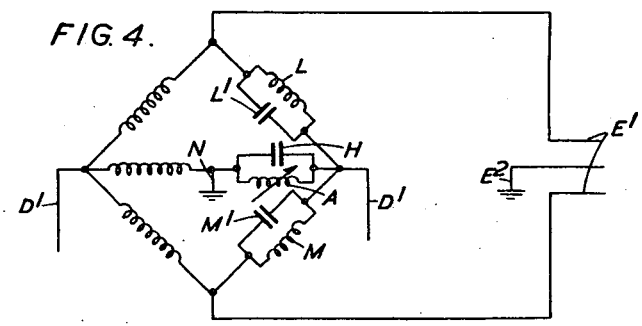
Figure 5:
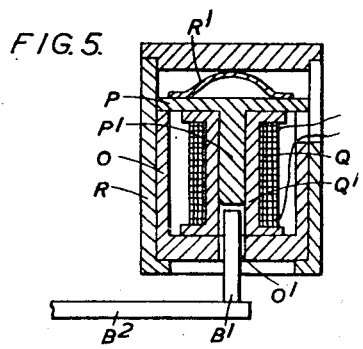

The invention may be carried into practice in various ways, but some convenient alternative arrangements according thereto are illustrated by way of example in the accompanying drawings, these arrangements being intended more especially for use in apparatus for measuring surface roughness. In these drawings, Figure 1 indicates diagrammatically the manner in which the arrangements are utilised in surface roughness measuring apparatus, Figures 2, 3 and 4 respectively illustrate three alternative circuit arrangements according to the invention, and Figure 5 shows by way of example one convenient practical form of variable inductance for use in the arrangements according to the invention.

The surface roughness measuring apparatus, in which the arrangements are more especially (although not exclusively) intended for use, is of the kind in which a stylus carried by a pick-up head is traversed along the surface under test, the working movements of the stylus approximately normal to the surface during such traversing being converted by an electromagnetic detector device into electrical energy for operating an indicating device, such for example as a pen recorder.

The invention itself is concerned with the detector device, whose primary element consists of a variable inductance, diagrammatically shown at A in Figure 1, part of the magnetic circuit of which is moved in accordance with the working movements of the stylus B to vary the value of the inductance. The variations of the inductance are utilised to modulate at C a carrier current generated by a suitable high frequency oscillator D, and the modulated carrier current is amplified at E and demodulated at F in suitable electronic circuits to operate the pen recorder G. Conveniently, the movable part consists of a small plunger $B^1$ of magnetic material carried on one end of a lever $B^2$ which is pivoted at $B^3$ and whose other end carries the stylus B.

Connected across the coil of the inductance A is a condenser H having such capacitance as to tune the inductance to resonance with the carrier frequency when the plunger $B^1$ is occupying a predetermined position relatively to the fixed part $A^1$ of the magnetic circuit of the inductance. The actual position of the plunger $B^1$ chosen for tuning may vary to suit the particular form of circuit used for modulating the carrier current, the choice being such in each case that the output of the detector device, and consequently the indication given by the pen recorder G, shall bear an approximately linear relationship to the working movements of the stylus. The modulation is preferably effected in a bridge circuit, in one arm of which the tuned inductance AH is connected, the high frequency carrier current being applied through leads $D^1$ across a diagonal of the bridge. The alternative arrangements now to be described differ from one another chiefly in the arrangement of the bridge circuit.

Figures 2, 3:
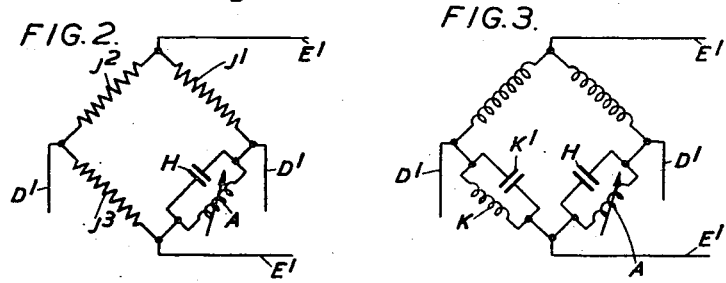

In one simple arrangement, shown in Figure 2, the tuned inductance AH occupies one arm of the bridge and the other three arms $J^1J^2J^3$ are purely resistive. The carrier current input is applied through the leads $D^1$ to one pair of opposite corners of the bridge, and the output, consisting of modulated carrier current, is taken from the other pair of opposite corners through leads $E^1$, such output being amplified and filtered and, after demodulation with or without low frequency amplification, applied to operate the pen recorder G. In this case the characteristics of the resistive arms $J^1J^2J^3$ of the bridge are so chosen that the bridge is balanced when the plunger $B^1$ of the inductance A is occupying the position in which the inductance is tuned by the condenser H to resonance with the carrier frequency.

With this arrangement the output from the bridge depends mainly on the change of phase of the potential developed across the inductance A, for the impedance of the bridge arm containing the tuned inductance will be at a maximum, and therefore more or less constant, in the neighbourhood of the resonant tuning position, whilst the phase changes rapidly and linearly through the resonant position.

Such a circuit will not however distinguish between equal movements of the stylus B in opposite directions from the position of the stylus which corresponds to the balance condition of the bridge, that is the resonant tuning position of the plunger $B^1$, and in order to secure the proper directional relationship between the stylus movement and the movement of the recording pen, it is necessary to operate the apparatus wholly on one side of the balance point of the bridge. Consequently, the characteristics of the circuit are so chosen that the inductance A is tuned to resonance and the bridge is balanced at a point at or just outside one end of the operative range of the apparatus, when the recording pen is at one side of the chart. The total magnification of the apparatus is so chosen that in all working positions of the stylus the recorder pen will lie within the recording range on the chart, and the operative range of the apparatus therefore depends on the range of movement of the pen on the chart, and within the whole of such range there will be an approximately linear relationship between stylus movement and pen movement.

In a preferred arrangement, shown in Figure 3, the tuned inductance AH is connected in one arm of the bridge, and another of the arms against which the tuned inductance is balanced is made reactive and contains, for example, a fixed inductance K in parallel with a fixed condenser $K^1$. In this case, the characteristics are so chosen that the bridge is balanced when the plunger $B^1$ is occupying a position just outside one end of the operative range of the apparatus, but the inductance A is tuned to resonance with the carrier frequency when the plunger $B^1$ is in some other position either within the operative range or just outside the other end thereof. For instance, if the operative range is designed to cover stylus movements up to a maximum of, say, four thousandths of an inch, a convenient position for resonance tuning might be, say, at .006 of an inch from the balance point.

In this arrangement the output of the bridge depends both on change of impedance and on change of phase. As the plunger $B^1$ approaches the resonant position, the impedance changes less rapidly and the phase changes more rapidly and the net result is an approximately linear law throughout the operative range.

The inductance A is preferably so arranged that the plunger $B^1$ closes a gap in the magnetic circuit substantially at the position in which the bridge is balanced. This provides a physical stop at one end of the operative range and automatically suppresses the unwanted side of the balance point. Moreover, in the neighborhood of the balance point, the bridge arm containing the variable inductance is then almost wholly capacitative, and this has the effect of filtering out unwanted harmonics to a marked extent, so that a much sharper balance is obtained than with the simple arrangement first above described. The operative range can in fact extend right up to the closed position of the gap.

It is sometimes desirable to obtain a differential output from the bridge in order to operate a balanced electric circuit for controlling the pen recorder. This can readily be achieved by means of a double bridge circuit, with the variable inductance in an arm common to the two halves of the bridge. For instance, as shown in Figure 4 using the preferred arrangement of Figure 3, the double bridge may consist of three pairs of arms connecting the two input terminals to which the high frequency carrier current leads $D^1$ are connected. The variable inductance A shunted by its tuning condenser H is then connected in one of the middle pairs of arms, and the corresponding arm in each of the outer pairs is reactive and includes a fixed inductance L or M shunted by a fixed condenser $L^1$ or $M^1$. The junction point of the middle pair of arms is earthed at N, and the junction points of the two outer pairs of arms constitute the two output terminals for connection through the leads $E^1$ to corresponding points of the two halves of the balanced measuring circuit, such circuit having its mid-point earthed at $E^2$.

With this arrangement, one half of the double bridge is arranged to be balanced when the plungers $B^1$ of the inductance A lies just outside one end of its operative range, whilst the other half is balanced when the plunger lies just outside the other end of the operative range. This will mean that, for any movement of the plunger within the operative range, the output of one half of the bridge will increase and that of the other half will decrease by an equal amount owing to the approximately linear relationship obtained.

The resonant tuning position of the plunger $B^1$ may be within or just outside the operative range. For instance, if the balance point of one half of the bridge has the plunger in the position closing a gap in the magnetic circuit, the balance point of the other half of the bridge might correspond to a stylus movement of, say, .004 of an inch from the closed gap position, and the resonant tuning point might again be chosen at .006 of an inch from such position.

This double bridge arrangement has the advantage that it leads to a push-pull output stage. When it is desired to have, say, two operative ranges, one extending from, say, .0001 to .001 of an inch, to deal with very small stylus movements, and another extending from .001 to .01 of an inch for larger stylus movements, the magnification in one case being ten times that for the other case to suit the recorder chart, the change from one range to the other will often make it desirable to alter the interval between the balance points of the two halves of the bridge, and this can readily be done by appropriately adjusting the reactive elements $LL^1$ and $MM^1$ in the two outer arms of the bridge. The switches controlling such adjustments can be ganged with the gain control switches for varying the magnification. It will be apparent that any number of alternative operative ranges can readily be provided, if desired. A further control, also ganged with the gain control, may be provided, if desired, to adjust the tuning condenser H across the variable inductance A, so as to vary the resonant tuning position when the operative range is changed, but this will not always be necessary.

Structurally, the variable inductance may be arranged in various ways, but in one convenient practical form shown in Figure 5 it consists of a generally cylindrical pot O of magnetic material having a central hole $O^1$ in its base, through which the magnetic plunger $B^1$ can pass with the minimum clearance necessary for free movement. The top of the pot O is closed by a plate P of magnetic material having a central downwardly protruding finger $P^1$ extending to near the hole $O^1$ in the base. There is thus a gap in the magnetic circuit (in addition to the small gap provided by the clearance of the hole $O^1$ in the base plate around the plunger $B^1$) between the end of the plunger $B^1$ and the end of the finger $P^1$, and it is this gap which may, if desired, be closed by the plunger at the balance point of the bridge in the manner mentioned above. The coil Q of the inductance is wound on a support $Q^1$ surrounding the finger $P^1$ and plunger $B^1$, within the pot O. The whole pot may be housed in a casing R of non-magnetic material containing spring means $R^1$ for holding the cover P of the pot O properly in engagement with the pot itself.

It will be appreciated that the foregoing description has been given by way of example only, and that the invention is not limtied to the arrangements described or to use in connection with surface roughness measuring apparatus and may be carried into practice in other ways.

What I claim as my invention and desire to secure by Letters Patent is:

1. An electromagnetic detector device for converting small movements into electrical energy for measurement purposes, comprising an inductance consisting of a coil linked with a magnetic circuit part of which is movable relatively to the coil for varying the value of the inductance, means whereby such movable part is moved in accordance with the small movement to be measured, an oscillator for generating a carried current whose frequency is high compared with those of the variations of the movement to be measured, means whereby the variations in the value of the inductance are utilized to modulate the amplitude of the carrier current generated by the oscillator, and means for tuning the inductance to be in resonance with the carrier frequency when the movable part of the magnetic circuit of the inductance is occupying a position in the neighborhood of that portion of its range of movement corresponding to the operative range of measurement, the modulating means comprising a bridge circuit supplied with carrier current from the oscillator and having three of its arms resistive and the remaining arm including the tuned inductance, the characteristics of the bridge being such that the bridge is balanced when the movable part of the inductance is occupying the resonant tuning position.

2. An electromagnetic detector device for converting small movements into electrical energy for measurement purposes, comprising an inductance consisting of a coil linked with a magnetic circuit part of which is movable relatively to the coil for varying the value of the inductance, means whereby such movable part is moved in accordance with the small movement to be measured, an oscillator for generating a carrier current whose frequency is high compared with those of the variations of the movement to be measured, means whereby the variations in the value of the inductance are utilized to modulate the amplitude of the carrier current generated by the oscillator, and means for tuning the inductance to be in resonance with the carrier frequency when the movable part of the magnetic circuit of the inductance is occupying a position in the neighborhood of that portion of its range of movement corresponding to the operative range of measurement, the modulating means comprising a bridge circuit supplied with carrier current from the oscillator and having at least three arms resistive and at least one arm including a variable inductance, the characteristics of the bridge being such that the bridge is balanced when the movable part of the inductance is occupying the resonant tuning position, and that the whole of the portion of the range of movement of such movable part corresponding to the operative range of measurement lies on one side of such position.

3. An electromagnetic detector device for converting small movements into electrical energy for measurement purposes, comprising an inductance consisting of a coil linked with a magnetic circuit part of which is movable relatively to the coil for varying the value of the inductance, means whereby such movable part is moved in accordance with the small movement to be measured, an oscillator for generating a carrier current whose frequency is high compared with those of the variations of the movement to be measured, means whereby the variations in the value of the inductance are utilized to modulate the amplitude of the carrier current generated by the oscillator, and means for tuning the inductance to be in resonance with the carrier frequency when the movable part of the magnetic circuit of the inductance is occupying a position in the neighborhood of that portion of its range of movement corresponding to the operative range of measurement, the modulating means comprising a bridge circuit supplied with carrier current from the oscillator and having at least one of its arms reactive and another arm balanced against the reactive arm and including the tuned inductance, the characteristics of the bridge and of the tuning means being such that the bridge is balanced when the movable part of the inductance is close to a position corresponding to one end of the operative range of measurement and the inductance is tuned to resonance with the carrier frequency when such part is close to a position corresponding to the other end of the operative range of measurement.

4. An electromagnetic detector device for converting small movements into electrical energy for measurement purposes, comprising an inductance consisting of a coil linked with a magnetic circuit part of which is movable relatively to the coil for varying the value of the inductance, means whereby such movable part is moved in accordance with the small movement to be measured, an oscillator for generating a carrier current whose frequency is high compared with those of the variations of the movement to be measured, means whereby the variations in the value of the inductance are utilized to modulate the amplitude of the carrier current generated by the oscillator, and means for tuning the inductance to be in resonance with the carrier frequency when the movable part of the magnetic circuit of the inductance is occupying a position in the neighborhood of that portion of its range of movement corresponding to the operative range of measurement, the modulating means comprising a bridge circuit supplied with carrier current from the oscillator and having at least one of its arms reactive and another arm balanced against the reactive arm and including the tuned inductance, the characteristics of the bridge and of the tuning means being such that the bridge is balanced when the movable part of the inductance reaches a position in which it closes a gap in the magnetic circuit such position corresponding to one end of the operative range of measurement, and that the inductance is tuned to resonance with the carrier frequency when such part is close to a position corresponding to the other end of the operative range of measurement.

5. An electromagnetic detector device for converting small movements into electrical energy for measurement purposes, comprising an inductance consisting of a coil linked with a magnetic circuit part of which is movable relatively to the coil for varying the value of the inductance, means whereby such movable part is moved in accordance with the small movement to be measured, an oscillator for generating a carrier current whose frequency is high compared with those of the variations of the movement to be measured, means whereby the variations in the value of the inductance are utilized to modulate the amplitude of the carrier current generated by the oscillator, and means for tuning the inductance to be in resonance with the carrier frequency when the movable part of the magnetic circuit of the inductance is occupying a position in the neighborhood of that portion of its range of movement corresponding to the operative range of measurement, the modulating means comprising a double bridge circuit supplied with carrier current from the oscillator and arranged to give a differential output, such bridge circuit having the tuned inductance connected in one of the pair of arms common to the two halves of the bridge.

6. An electromagnetic detector device for converting small movements into electrical energy for measurement purposes, comprising an inductance consisting of a coil linked with a magnetic circuit part of which is movable relatively to the coil for varying the value of the inductance, means whereby such movable part is moved in accordance with the small movement to be measured, an oscillator for generating a carrier current whose frequency is high compared with those of the variations of the movement to be measured, means whereby the variations in the value of the inductance are utilized to modulate the amplitude of the carrier current generated by the oscillator, and means for tuning the inductance to be in resonance with the carrier frequency when the movable part of the magnetic circuit of the inductance is occupying a position in the neighborhood of that portion of its range of movement corresponding to the operative range of measurement, the modulating means comprising a double bridge circuit supplied with carrier current from the oscillator and arranged to give a differential output, such bridge circuit having the tuned inductance connected in one of the pair of arms common to the two halves of the bridge and having a reactive arm in each half balanced against the said arm containing the tuned inductance, the characteristics of the double bridge being such that one half of the bridge is balanced when the movable part of the inductance is occupying a position outside one end of the portion of its range of movement corresponding to the operative range of measurement and the other half is balanced when the movable part occupies a position outside the other end of such portion of its range.

7. The combination with the features claimed in claim 6, of means for altering the interval between the two balance points of the double bridge to suit alteration in the amplification factor in the measuring circuit to which the modulated carrier current is fed.

8. An electromagnetic detector device for converting small movements into electrical energy for measurement purposes, comprising an inductance consisting of a coil linked with a magnetic circuit part of which is movable relatively to the coil for varying the value of the inductance, means whereby such movable part is moved in accordance with the small movement to be measured, an oscillator for generating a carrier current whose frequency is high compared with those of the variations of the movement to be measured, means whereby the variations in the value of the inductance are utilized to modulate the amplitude of the carrier current generated by the oscillator, and means for tuning the inductance to be in resonance with the carrier frequency when the movable part of the magnetic circuit of the inductance is occupying a position in the neighborhood of that portion of its range of movement corresponding to the operative range of measurement, the inductance comprising a pot of magnetic material having a central hole in its base, a magnetic cover for the pot having a finger protruding centrally down towards such hole, a small plunger of magnetic material passing through the hole towards the end of the finger and constitiuting the movable part of the magnetic circuit of the inductance, a support surrounding the finger within the pot, and a coil wound on such support.

9. The combination with the features claimed in claim 8, of a casing of non-magnetic material for housing the magnetic pot, and spring means within such casing for pressing the magnetic cover of the pot into engagement with the main body of the pot.

10. An electromagnetic detector device for converting small movements into electrical energy for measurement purposes, comprising an inductance consisting of a coil linked with a magnetic circuit part of which is movable relatively to the coil for varying the value of the inductance, means whereby such movable part is moved in accordance with the small movement to be measured, an oscillator for generating a carrier current whose frequency is high compared with those of the variations of the movement to be measured, means whereby the variations in the value of the inductance are utilized to modulate the amplitude of the carrier current generated by the oscillator, and means for tuning the inductance to be in resonance with the carrier frequency when the movable part of the magnetic circuit of the inductance is occupying a position in the neighborhood of that portion of its range of movement corresponding to the operative range of measurement, the tuning means comprising a condenser connected in parallel with the inductance, and the modulating means comprises a bridge circuit supplied with carrier current from the oscillator and having the inductance and tuning condenser in one of its arms and the inductance comprises a pot of magnetic material having a central hole in its base, a magnetic cover for the pot having a finger protruding centrally down towards such hole, a small plunger of magnetic material passing through the hole towards the end of the finger and constituting the movable part of the magnetic circuit of the inductance, a support surrounding the finger within the pot, and a coil wound on such support.

RICHARD EDMUND REASON.

(References on following page)

REFERENCES CITED

The following references are of record in the file of this patent:

UNITED STATES PATENTS

| Number | Name | Date |
|---|---|---|
| 1,615,645 | Nyman | Jan. 25, 1927 |
| 1,732,393 | Andrewes | Oct. 22, 1929 |
| 2,026,758 | Turner | Jan. 7, 1936 |
| 2,208,910 | Pampel et al. | July 23, 1940 |
| 2,215,148 | Ehrler et al. | Sept. 17, 1940 |
| 2,344,217 | Reason et al. | Mar. 14, 1944 |
| 2,361,173 | Browne, Jr. | Oct. 24, 1944 |
| 2,361,788 | Neff | Oct. 31, 1944 |
| 2,377,869 | Elliott | June 12, 1945 |
| 2,414,224 | Douglas | Jan. 14, 1947 |
| 2,421,578 | Reason | June 3, 1947 |
| 2,451,858 | Mork | Oct. 19, 1948 |